United States Patent

Paterek et al.

[11] Patent Number: 5,279,907
[45] Date of Patent: Jan. 18, 1994

[54] SAFETY VENT FOR A CONTAINER AND METHOD OF MAKING THE SAME

[75] Inventors: Dieter Paterek; Donald H. Hall; Larry G. Burrows, all of Hamilton, Ohio

[73] Assignee: Emerson Electric Co., St. Louis, Mich.

[21] Appl. No.: 881,068

[22] Filed: May 11, 1992

[51] Int. Cl.⁵ .............................. H01M 2/12
[52] U.S. Cl. ...................... 429/56; 29/623.2; 72/379.4; 220/207; 220/367
[58] Field of Search .......... 429/56; 220/89.2, 207, 220/367; 72/379.4; 29/623.1

[56] References Cited

U.S. PATENT DOCUMENTS

| Re. 33,217 | 5/1990 | Nguyen | 72/379.4 |
|---|---|---|---|
| 3,622,051 | 11/1971 | Benson | 220/89.2 X |
| 4,115,629 | 9/1978 | Dey et al. | 429/56 |
| 4,698,282 | 10/1987 | Mantello | 429/56 |
| 4,789,608 | 12/1988 | Oswald | 429/56 |
| 4,803,136 | 2/1989 | Bowsky et al. | 429/56 |
| 4,993,602 | 6/1989 | Casey | 222/396 |
| 5,004,656 | 4/1991 | Sato et al. | 429/162 |
| 5,042,675 | 8/1991 | Patterson | 429/56 X |

Primary Examiner—Stephen Kalafut
Attorney, Agent, or Firm—Polster, Lieder, Woodruff & Lucchesi

[57] ABSTRACT

A pressure release safety vent arrangement for an ingredient container including an opening extending through one portion of the container and a preselected separate profoundly rupturable foil membrane fastened in covering and sealing relation to the opening, the membrane being selected to profoundly tear away and rupture to vent the container under a selected pressure.

22 Claims, 4 Drawing Sheets

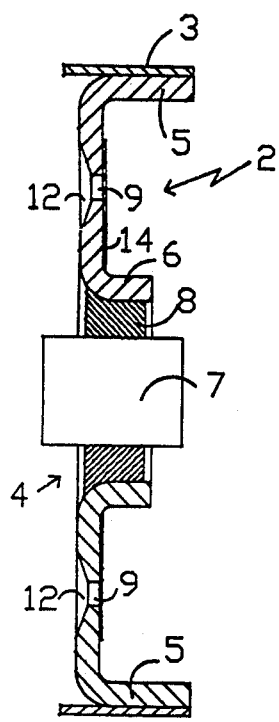
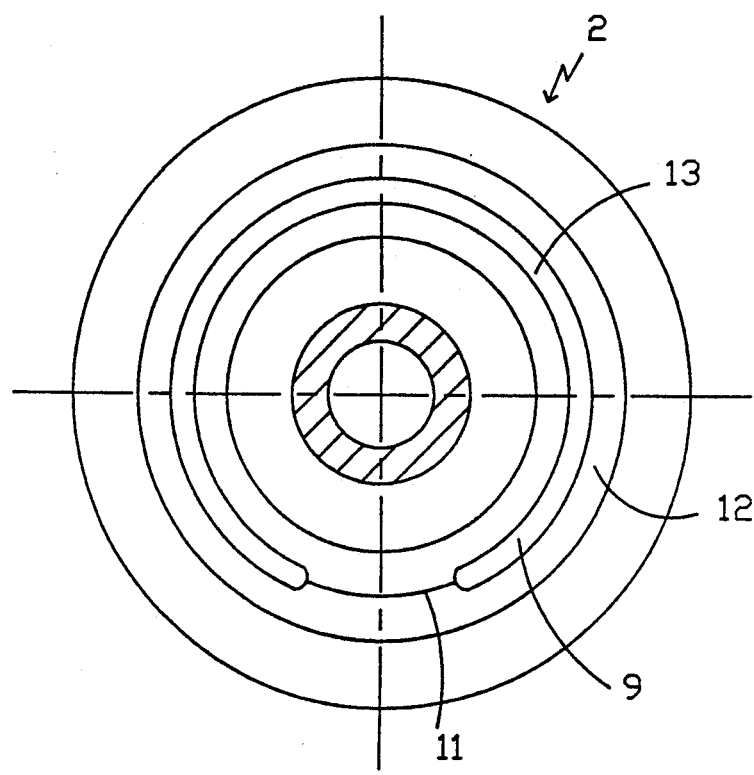
FIG. 1    FIG. 2
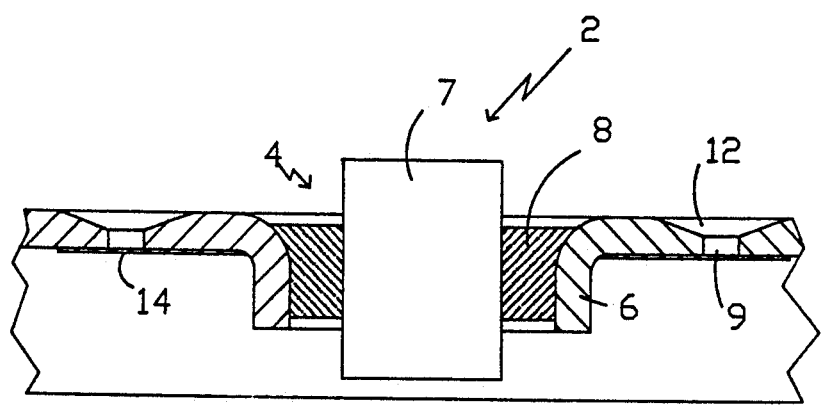
FIG. 3

SAFETY VENT FOR A CONTAINER AND METHOD OF MAKING THE SAME

BACKGROUND OF THE INVENTION

The present invention relates to sealed ingredient container devices and more particularly to hermetically sealed electrochemical container devices including safety vents therein and a method of making safety vents for such devices.

It is well known to provide a rupturable safety vent in a container body which ruptures when gas pressure develops within the container beyond a predetermined limit to permit gas release in a manner to avoid uncontrollable container disassembly or disintegration with possible concomitant damage to surrounding environment and personnel. It has been recognized that past safety vent forming means have resulted in residual stresses, stress corrosion, non-uniformity in metal thickness and deformed metal grain structure leading to non-uniform pressure sensitivity and pressure responsitivity characteristics. It also has been recognized that safety vents which allow small leaks and which limit the rate of escape of undesirable elements do in some instances serve to permit pressure build-up to a level where uncontrollable and undesirably damaging explosions of the container to be vented occur, such as in a lithium battery, where slow venting can allow battery temperature increase to the melting point of lithium, which in the presence of electrolyte can result in violent explosions. In U.S. Pat. No. 4,803,136, issued to Benjamin Bowsky et al on Feb. 7, 1989, several of these problems have been recognized, including the need for a safety vent which provides for profound and instantaneous rupture. This patent calls for an etching process to produce a flat safety vent membrane of uniform thickness and preselected surface area to have a controlled and uniform pressure sensitivity of substantially unchanged residual stress, the membrane being capable of withstanding a selected pressure before profoundly rupturing. In U.S. Pat. No. 4,993,602, issued to Donald P. Casey on Feb. 19, 1991, it is recognized to provide a safety vent opening in a pressurized container with a sealing member positioned over the opening to be normally retained in sealing relation with the opening to prevent venting through the opening. Upon a rise of pressure in the container to a predetermined cracking pressure, an elastomeric device cooperative with the sealing member compresses to allow the sealing member to yield from the opening. Nothing in the structure of this patent contemplates profound and instantaneous rupture of a sealing membrane and, in fact, the teaching of a "cracking pressure" for an opening covering sealing membrane with the concept of "cracking" is contrary to the concept of profound rupture. In U.S. Pat. No. 5,004,656, issued to Kiyoshi Sato et al on Apr. 2, 1991, a welded double sealing member for perfectly sealing a charging opening of a battery vessel is disclosed, such double sealing member being of a permanent nature and not a safety vent. In fact, this patent— like U.S. Pat. No. 4,803,136—teaches an annular thin groove in the bottom wall of the battery vessel to prevent battery explosion; however, the Sato patent does not indicate how such groove is formed or whether it is capable of profound rupture.

The present invention, recognizing the known pressures vessel safety vent structures of the prior art and particularly the desirability of providing a safety vent structure capable of profoundly rupturing upon reaching a selected pressure, provides a unique and novel pressure vessel safety vent structure capable of achieving such a concept in a comparatively economic and straightforward manner. In addition, the present invention provides a novel economical and straightforward method of manufacturing such safety vent structure with a minimum of manufacturing and assembly steps and with a minimum of tooling and parts. Further, the novel structure of the present invention is capable of effectively operating as a safety vent in smaller battery vessels to be readily responsive to venting at much lower pressure levels than a number of safety vent arrangements of the past.

Various other features of the present invention will become obvious to one skilled in the art upon reading the disclosure set forth herein.

SUMMARY OF THE INVENTION

More particularly, the present invention provides a pressure release safety vent for an ingredient container housing comprising: a safety vent opening in at least one container portion of the container housing extending from one face of the container portion to the opposite face thereof, the safety vent opening being of selected cross-sectional area and shape; and a selected separate profoundly rupturable foil membrane fastened in covering and sealing relation with respect to the safety vent opening, the membrane being sized and configured in thickness to seal the safety vent opening before profoundly tearing away and rupturing to vent the container housing under a preselected internal housing pressure which might occur in container housing. In addition, the present invention provides a novel method of manufacturing such structure in the form of lids for vessel container housings from a continuously moving strip of selected material comprising the steps of: stamping lid blanks in a first zone in spaced relation on the moving strip of material with each blank being of preselected size and configuration; shaping each of the stamped lid blanks in a second zone to provide a vessel container cover to fit a vessel container; piercing the vessel container cover in a third zone to provide an aperture therein for a conductive pin assembly; punching each of the vessel container covers in a fourth zone at a selected spaced position from the conductive pin assembly aperture in the container cover to provide a pressure relief safety vent opening; and, separating each vessel container cover including the conductive pin assembly aperture and spaced pressure relief safety vent opening in a fifth zone for further assembly operations. The present invention further provides steps which include forming a surrounding lip around each conductive pin aperture; inserting a brazing material into the vent opening; covering the opening with an inelastic foil material; and, brazing the foil material with the brazing material to fast seal the opening. In addition, suitable pin and glass assembly steps are taken to glass seal a conductive pin to the aperture surrounding lip.

It is to be understood that various changes can be made in one or more of the several parts of the novel pressure release safety vent described herein and in one or of the several steps described herein of the novel method of making such structure without departing from the scope or spirit of the present invention.

BRIEF DESCRIPTION OF THE DRAWINGS

Referring to the drawings which disclose one advantageous embodiment of the present inventive apparatus and a novel method for forming the same:

FIG. 1 is a partial cross-sectional view of a lid portion of a pressure vessel machined to include the safety vent features of the present invention, a portion of a pressure vessel with which the lid can be associated also is disclosed;

FIG. 2 is a top plan view of the lid structure of FIG. 1;

FIG. 3 is an enlarged cross-sectional view of a portion of FIG. 1;

DETAILED DESCRIPTION OF THE INVENTION

Figure 4:
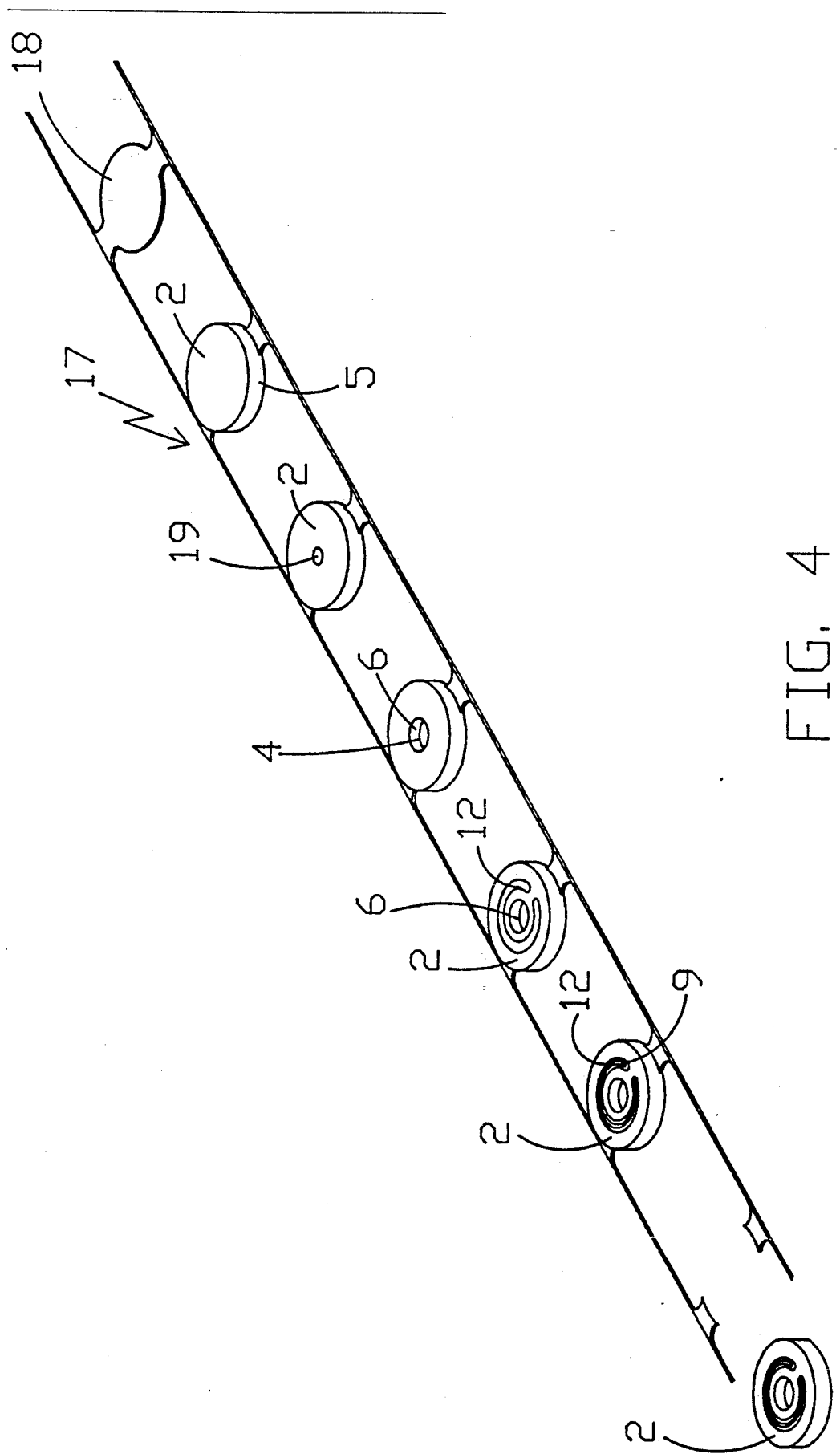
FIG. 4 is an isometric view schematically disclosing a number of the steps involved in progressively forming the lid structure in accordance with the present invention.

Referring to FIGS. 1–3 of the drawings, a lid cover 2 incorporating the novel pressure release safety vent structure is disclosed in press fitted engagement with pressure vessel 3. The lid cover shown is designed particularly for a lithium type battery vessel, having an electro-chemical ingredient disposed therein and, as such, is formed from a 304L stainless steel which has been fully annealed. It is to be understood that other suitable materials can be utilized to form a lid cover 2 with a peripheral side wall 5, the particularly material selected being determined by the nature of the chemical and physical properties of the ingredient to be stored in the vessel with which the lid cover 2 is to be associated and with which the inventive safety vent feature advantageously is compatible. It further is to be understood that the inventive safety vent feature disclosed herein is not to be considered as limited to the disclosed location in a lid cover but that other portions of the associated vessel can be utilized. As can be seen in the drawings, lid cover 2 includes a centrally disposed aperture 4 having a peripherally surrounding lip portion 6 to receive a conductive pin 7 centrally extending therethrough in electrically insulated sealed relation to lip portion 6 by means of a suitable fusing material 8, such as glass.

In accordance with the present invention, the novel safety vent incorporated into lid cover 2 includes as annular, horse shoe shaped safety vent opening 9 in the lid cover. This vent opening 9 extending from one face of lid cover 2 to the opposite face thereof is positioned to surround pin receiving aperture 4 in spaced relation therefrom. It is to be noted that the opposed ends of annular, horse shaped opening 9 are spaced from each other a suitably selected distance to provide a hinge element 11 as part of lid cover 2 to ensure that a portion of lid cover 2 remains integral with the lid cover in the event of profound rupture of the safety vent described hereinafter. As can be seen more clearly in FIGS. 2 and 3, advantageously the annular through-opening 9 includes an annular groove 12 of V-shaped configuration, which in the battery lid cover 2 disclosed is designed to be positioned within the internal, ingredient holding portion of vessel 3 (FIG. 1). As will be described hereinafter, annular groove 12 can be coined into lid cover 2 to extend at a selected V-shaped angle through approximately one-half the depth or thickness of lid cover 2 so as to be in communication with the remaining peripherally vertical portion of annular safety vent opening 9 (FIG. 3). It is to be understood that the dimensions of safety vent opening 9, including the groove 12 of V-shaped cross-section and communicating vertical cross-section portion can vary in accordance with the design and properties of the vessel with which they are to be associated.

As can be seen more clearly in FIG. 3 and pursuant to the present invention, annular safety vent opening 9 is covered with a profoundly rupturable and inelastic annular foil membrane 14. In the battery lid cover 2 disclosed, foil membrane 14 is sized to fully cover the ambient portion 13 face of annular horse shoe shaped opening 9. For lithium battery vessels of the type disclosed, foil membrane 14 can be designed to withstand pressures in the range of approximately two hundred to four hundred pounds per square inch (200–400 psi) and advantageously to withstand pressures of approximately two hundred and fifty pounds per square inch (250 psi $+/-50$ psi). The membrane 14 can be in the range of 0.0010 to 0.004 inches and advantageously of approximately two thousandths of an inch thick (0.002 inches) and comprised by weight of approximately 92% Ni, 4.5% Si and 2.9% B to be compatible with the electro-chemical ingredient to be disposed in the battery vessel 3 with which it is in direct communication. A suitable annular brazing strip of material 16 (FIG. 5) is disposed in the vertical cross-section portion of annular opening 9, the annular brazing strip 16 advantageously being by weight of approximately fifty percent (50%) Ag and fifty percent (50%) Cu. The safety foil member 14 is fastened in sealing and covering relation with annular safety vent opening 9. When the lid cover has been so assembled, conductive pin 7 can then be inserted through centrally disposed aperture 4 to be sealed to peripheral lip portion 6 by a suitable fusing glass 8. It is to be understood that the dimensional sizing and materials of the parts abovedescribed can be varied in accordance with the pressures and nature of the vessel with which they desirably should be compatible.

Figure 5:
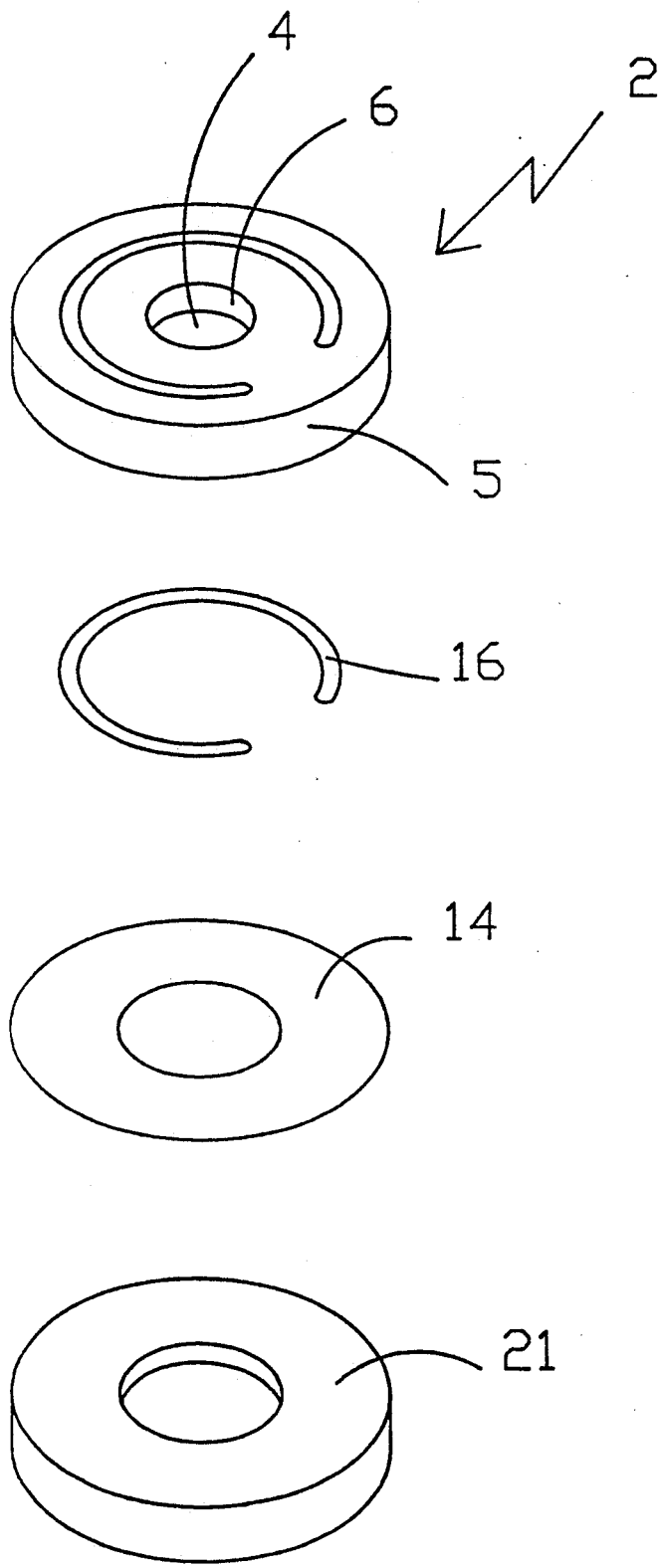
FIG. 5 is an exploded view of a lid formed in accordance with the present invention, further the brazing ring material, the safety vent foil and the brazing fixture—all of which are utilized in carrying out additional steps of the inventive method; and, FIG. 6 is an enlarged cross-sectional view of the several parts of FIG. 5 in an assembled brazing position.
Figure 6:
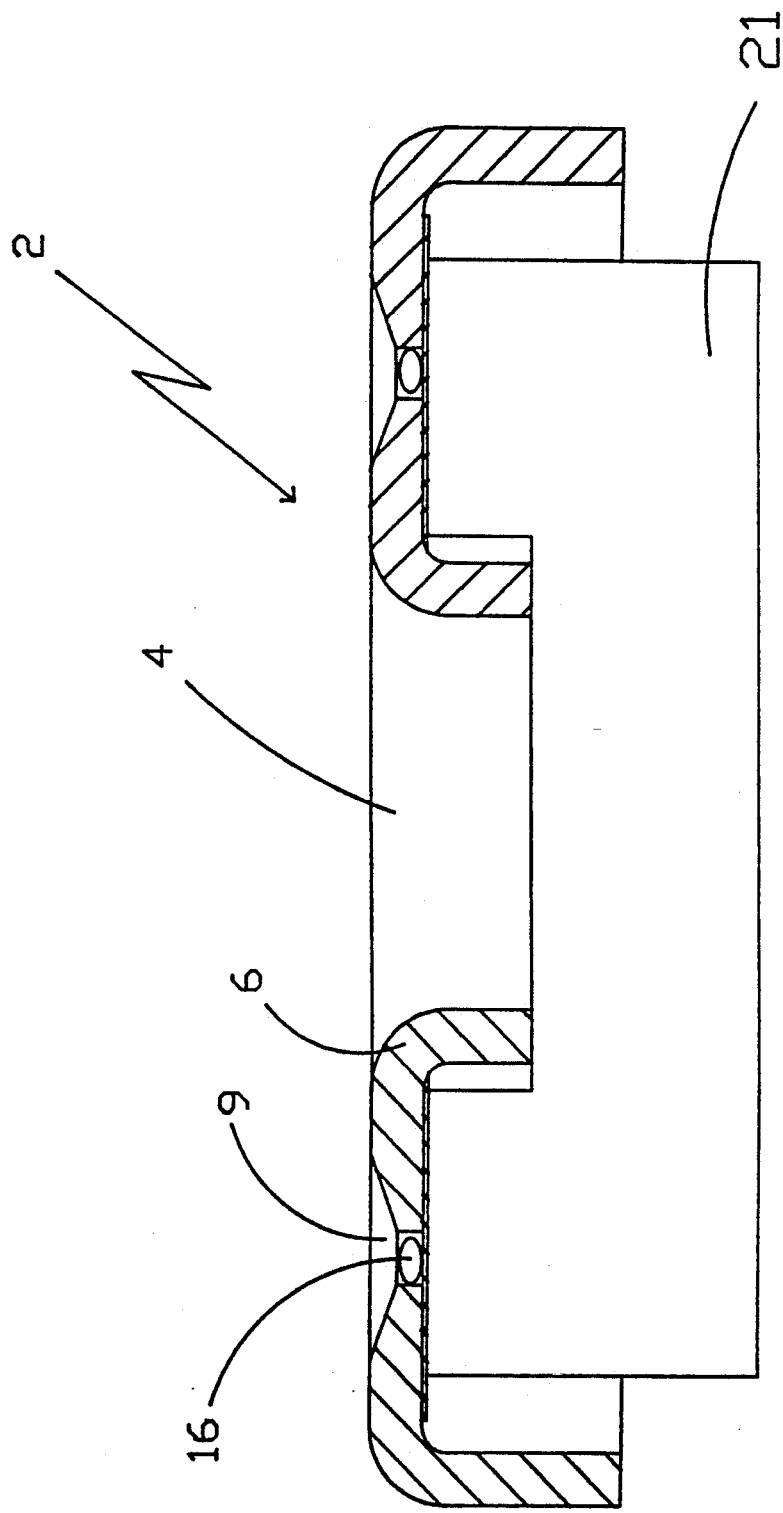

Referring to FIGS. 4–6 of the drawings, the novel method of manufacturing battery vessel lids for battery vessel container housings 3 from a preselected width of continuously moving strip 17 of material, such as 304L fully annealed stainless steel, is disclosed. Strip 17 of material can be within a selected range of width and thickness in accordance with the results desired. As can be seen in the progressive schematic forming arrangement of FIG. 4, strip 17 is stamped in a first zone as spaced attached circular lid blanks 18 with each blank being of a selected diameter. Each stamped lid blank 18 is then formed in a second zone to provide the strip attached battery vessel lid cover 2 with a peripheral side wall 5 of a preselect depth to snugly engage with a suitably sized cylindrical battery container vessel 3. In a third zone, each battery vessel container cover or lid 2 is pierced to provide a central aperture 19 of selected diameter for subsequent extrusion to a centrally disposed aperture 4 in a fourth zone. Once central aperture 19 is extruded in the fourth zone to enlarge the aperture to centrally disposed aperture 4 and to form the peripheral aperture surrounding lip 6 having a selected inner diameter and depth to receive a conductive pin assembly in insulated sealed relation with peripheral lip 6, lid cover 2 is then moved to a fifth zone. In the fifth zone, annular horse shoe shaped groove 12 is coined so as to spacedly surround expanded pin assembly receiving extruded central aperture 4 with the opposed extremities of the horse shoe groove 12 being selectively spaced from each other to provide the aforediscussed securing hinge 11 in the event of profound rupture, such groove 12 being coined to be of preselected depth and sloping cross-section. The groove 12 is then punched in a sixth zone to provide the horse shoe shaped vertical opening 9 and the cover lid 2 then is severed in a seventh zone to provide the completed battery vessel cover lid 2 which has been stamped, formed, pierced, extruded, coined, and punched. It is to be understood that in carrying out the inventive method above and hereinafter described it would be within the scope of the invention to perform one or more of the several above and hereinafter described steps in the same zone and possibly even simultaneously.

As can be seen in FIGS. 5 and 6 of the drawings, once completed cover lid 2 has been shaped and severed as aforedescribed a suitable annular horse shoe shaped brazing strip 16 is inserted into opening 9 in an eighth zone. An annular foil membrane 14 is then provided in a ninth zone to cover the brazing strip containing safety vent opening 9 and a carbon brazing fixture 21 appropriately sized is employed to braze the foil membrane 14 in covering and sealing safety vent relation to the opening 9 in cover lid 2. As is generally known in the art (and not shown), appropriate fixturing jigs can then be employed to insert a conductive pin in glass sealed relation to lip portion 6 of cover lid 2.

From the above, it can be seen that a novel safety vent structure suitable to profoundly rupture under lower pressure excesses can be manufactured and assembled efficiently and economically with a minimum of parts and with a minimum of steps.

The invention claimed is:

1. A pressure release safety vent for an ingredient container housing including a container portion and a lid portion comprising:

a longitudinally extending safety vent opening in said housing adjacent said lid portion of said container housing extending longitudinally in spaced relation along substantially the entire periphery of said lid portion from one face of said housing to the opposite face thereof, said safety vent opening being of selected cross-sectional area and shape along the length thereof;

a selected separate profoundly rupturable foil membrane fastened in flat covering and sealing relation with respect to the entirety of said longitudinally extending safety vent opening, said membrane being sized and configured in thickness to seal the entirety of said safety vent opening before profoundly tearing away and rupturing to fully vent said container housing under a selected internal housing pressure which might occur in said container housing.

2. The pressure release safety vent of claim 1, said ingredient container housing serving as a battery vessel and being charged with an electro-chemical ingredient.

3. The pressure release safety vent of claim 1, said profoundly rupturable foil membrane being of a substantially inelastic material of selected thickness.

4. The pressure release safety vent of claim 1, said foil membrane being in direct communication with an ingredient disposed in said container housing.

5. The pressure release safety vent of claim 1, said foil membrane being of a material compatible with the confined materials disposed within said ingredient container housing.

6. The pressure release safety vent of claim 1, said foil membrane being a thin metallic nickel alloy material compatible with the ingredient to be disposed in said housing.

7. The pressure release safety vent of claim 6, said ingredient being a battery electrolyte.

8. The pressure release safety vent of claim 1, said container portion and said foil membrane being of compatible metallic material capable of being brazed to said cover portion in covering and sealing relation with respect to the entirety of said safety vent opening.

9. The pressure release safety vent of claim 1, said safety vent opening extending longitudinally intermediate a longitudinally extending recessed groove from one recessed groove face of said container portion to the opposite face thereof.

10. The pressure release safety vent of claim 1, said container portion being in the form of a circular lid cover for a hermetically sealed lithium battery having a conducting pin extending from ambient through said lid cover into said container housing in electrical insulation with said lid cover, said lid cover including said longituding extending opening in the form of an annular groove extending from the ambient face thereof toward said container housing with an annular opening therein in surrounding spaced relation to said pin to provide said longitudinally extending safety vent opening, said flat thin foil membrane being an annular strip sized and configured to cover and seal the entirety of said annular safety vent opening.

11. The pressure release safety vent of claim 7, said foil membrane being a foil material within the approximate thickness range of 0.0010 to 0.004 inches and of a material comprised by weight of approximately 92% Ni, 4.5 Si, and 2.9% B.

12. The pressure release safety vent of claim 8; said foil membrane being fastened to said lid cover opening with a selected brazing material.

13. The pressure release safety vent of claim 12, said brazing material being comprised by weight of approximately 50% Ag and 50% Cu.

14. The pressure release safety vent of claim 13, said lid cover being a 304L stainless steel.

15. A pressure release safety vent for a stainless steel battery lid cover for a metallic battery vessel housing having an electro-chemical ingredient disposed therein, said lid cover having a conductive pin centrally extending therethrough in electrically insulated relation to said lid cover comprising:

an annular horse-shoe shaped safety vent opening in said lid cover surrounding said electrically insulated pin in spaced relation therefrom, said horse-shoe shaped safety vent opening extending longitudinally in spaced relation along substantially the entire periphery of said lid cover from one face of said lid cover to the opposite face thereof;

a profoundly rupturable and inelastic longitudinally extending foil membrane of a nickel alloy of approximately 0.002 inches thickness comprised by weight of approximately 92% Ni; 4.5% Si and 2.9% B to be compatible with said electro-chemical ingredient disposed in said battery vessel housing to be in direct communication with said electrical chemical ingredient to be disposed in said battery vessel; and, a brazing material comprised by weight of approximately 50% Ag and 50% Cu to fasten said longitudinally extending foil membrane to said battery vessel lid cover in covering and sealing relation with respect to the entirety of said longitudinally extending opening.

16. A method of manufacturing vessel lid covers for vessel container housings from a continuously moving strip of preselected material comprising of:

stamping lid blanks in a first zone in spaced relation on said moving strip of material with each blank being of selected size and configuration;

shaping each of said stamped lid blanks in a second zone to provide a vessel container lid cover to fit a vessel container;

piercing each of said vessel container lid covers in a third zone to provide an aperture therein for a conductive pin assembly;

punching each of said vessel container lid covers in a fourth zone at a selected spaced position from said conductive pin assembly aperture in said container lid cover to provide a pressure relief safety vent opening; and separating each vessel container lid cover including said conductive pin assembly aperture and spaced pressure relief safety vent opening in a fifth zone for further assembly operations.

17. The method of manufacturing battery vessel lid covers of claim 16, said shaping said lid blanks in said second zone including forming a peripheral side wall in each of said vessel container lids to extend substantially normally from the periphery of each of said lid covers.

18. The method of manufacturing battery vessel lids of claim 16, further including the step of forming a peripheral lip around each conductive pin aperture pierced in each lid cover in said third zone.

19. The method of manufacturing battery vessel lid covers of claim 16, wherein said stamping, shaping, piercing and punching steps are selectively configured to provide battery vessel lid covers, each of which are of cylindrical shape and sized to fit a cylindrical battery vessel container housing, with each lid cover having a circular surface including a centrally disposed aperture for a conductive pin assembly and a punched safety vent opening of annular horse-shoe shape to surround said aperture in selective spaced relation therefrom.

20. The method of manufacturing battery vessel lid covers of claim 16, said further assembly operations including the further steps of fastening a profoundly rupturable inelastic foil membrane in covering and sealing relation with respect to said vent opening in each of said battery vessel container covers.

21. The method of claim 20, said further assembly operations including the further steps of inserting brazing material into said vent opening, covering said vent opening with said inelastic foil material and brazing said inelastic foil material with said brazing material in fast sealing and covering relation to said opening.

22. A method of manufacturing battery vessel lid covers for battery vessel container housings from a sufficiently selected width of continuously moving strip of 304L fully annealed stainless steel material in a selected range of thickness comprising the successively progressive steps of:

stamping spaced substantially circular lid blanks in a first zone in spaced attached relation with said moving strip of material with each blank being of a selected diameter;

forming each of said stamped lid blanks in a second zone to provide a strip attached battery vessel lid cover having a peripheral side wall with a preselected depth to snugly fit a suitably sized cylindrical battery container vessel;

piercing each of said strip attached battery vessel container covers in a third zone to provide a central aperture of selected diameter for extrusion;

extruding each pierced aperture of said strip attached battery container lid covers in a fourth zone to form a surrounding aperture lip having a selected inner diameter and depth to receive a conductive pin assembly;

coining a groove in a fifth zone in spaced surrounding horse-shoe shape to each conductive pin assembly receiving aperture with the opposed extremities of each of said horse-shoe shaped grooves being selectively spaced from each other;

said coined horse-shaped grooves being of preselected V-shaped depth;

punching a horse-shoe shaped safety vent opening through each of said grooves in a sixth zone;

severing from said strip each of said stamped, formed, pierced, extruded, coined and punched battery vessel container lid covers in a seventh zone;

inserting a horse-shoe shaped brazing strip in each of said safety vent openings in an eighth zone;

inserting an annular foil membrane to internally cover said brazing strip containing safety vent openings in a ninth zone; and, brazing said foil membrane to said lid cover with an appropriately sized carbon brazing fixture assembly in a tenth zone.

* * * * *

UNITED STATES PATENT AND TRADEMARK OFFICE
CERTIFICATE OF CORRECTION

PATENT NO. : 5,279,907
DATED : January 18, 1994
INVENTOR(S) : F. Dieter Paterek et al.

It is certified that error appears in the above-indentified patent and that said Letters Patent is hereby corrected as shown below:

```
Claims
Column 6, line 15, delete "container portion" and insert --
housing --.
Column 6, line 17, delete "cover portion" and insert -- housing
--.
Column 6, line 20, delete "extending longitudinally" and insert
-- longitudinally extending --.
Column 6, line 22, delete "container portion" and insert --
housing --.
Column 6, line 25, delete "container" and insert -- lid --.

Column 6, line 44, delete "lid cover" and insert -- housing --.
```

Signed and Sealed this

Twenty-seventh Day of September, 1994

Attest:

BRUCE LEHMAN

*Attesting Officer*    *Commissioner of Patents and Trademarks*